(12) United States Patent
Kuo et al.

(10) Patent No.: US 12,351,367 B2
(45) Date of Patent: Jul. 8, 2025

(54) PULP-MOLDED CUP LID WITH LEAKPROOF STRUCTURE

(71) Applicant: Golden Arrow Printing Technology (Kunshan) Co., LTD., Kunshan (CN)

(72) Inventors: Chien-Kuan Kuo, New Taipei (TW); Chun-Huang Huang, New Taipei (TW)

(73) Assignee: GOLDEN ARROW PRINTING TECHNOLOGY (KUNSHAN) CO., LTD., Kunshan (CN)

(*) Notice: Subject to any disclaimer, the term of this patent is extended or adjusted under 35 U.S.C. 154(b) by 31 days.

(21) Appl. No.: 18/406,210

(22) Filed: Jan. 7, 2024

(65) Prior Publication Data

US 2024/0253869 A1    Aug. 1, 2024

(30) Foreign Application Priority Data

Feb. 1, 2023   (CN) .......................... 202320139891.3

(51) Int. Cl.
| | | |
|---|---|---|
| *B65D 43/06* | (2006.01) | |
| *B65D 43/02* | (2006.01) | |
| *D21J 3/00* | (2006.01) | |

(52) U.S. Cl.
CPC ....... *B65D 43/065* (2013.01); *B65D 43/0208* (2013.01); *D21J 3/00* (2013.01); *B65D 2543/00092* (2013.01); *B65D 2543/00305* (2013.01); *B65D 2543/00351* (2013.01); *B65D 2543/0049* (2013.01); *B65D 2543/00537* (2013.01); *B65D 2543/00555* (2013.01); *B65D 2543/00629* (2013.01); *B65D 2543/00685* (2013.01); *B65D 2543/00731* (2013.01); *B65D 2543/00796* (2013.01)

(58) Field of Classification Search
CPC ........ B65D 43/065; B65D 2543/00046; B65D 43/0208
See application file for complete search history.

(56) References Cited

U.S. PATENT DOCUMENTS

| | | |
|---|---|---|
| 4,412,629 A | 11/1983 | Dart et al. |
| 5,624,053 A | 4/1997 | Freek et al. |
| 8,196,772 B2 | 6/2012 | Leon et al. |
| 2013/0248481 A1 | 9/2013 | Hoekstra et al. |

(Continued)

FOREIGN PATENT DOCUMENTS

| | | |
|---|---|---|
| CN | 2441403 Y | 8/2001 |
| CN | 101637982 A | 2/2010 |
| CN | 201431246 Y | 3/2010 |

(Continued)

*Primary Examiner* — Jeffrey R Allen
(74) *Attorney, Agent, or Firm* — Cheng-Ju Chiang (57) ABSTRACT

A pulp-molded cup lid with a leakproof structure is introduced in accordance to the present invention. The leakproof structure is constructed jointly by both of an annular hook and a bulger of an annularly peaked saddle, and an upward-bent bottom of an annularly caved channel, all of which are located respectively at different standard position angles to jointly clamp an annular roll side of a cup body in a manner of making the annular roll side being tightly snapped-on, water-sealed and movement-restricted within a movement-restricting space of the annularly peaked saddle, thereby effectively preventing a fluid, stored within the cup body, from spillover, wherein the standard position angle where the bulger is located is an acute angle.

12 Claims, 4 Drawing Sheets

(56) References Cited

U.S. PATENT DOCUMENTS

2018/0086511 A1    3/2018  Lin

FOREIGN PATENT DOCUMENTS

| | | |
|---|---|---|
| CN | 202807367 U | 3/2013 |
| CN | 205493411 U | 8/2016 |
| CN | 103603234 B | 9/2016 |
| CN | 111996841 A | 11/2020 |
| TW | 1430923 B | 3/2014 |
| TW | 1542755 B | 7/2016 |
| TW | 1736922 B | 8/2021 |
| WO | 2011/009229 A1 | 1/2011 |
| WO | 2011/152703 A1 | 12/2011 |
| WO | 2013/013550 A1 | 1/2013 |
| WO | 2015/157877 A1 | 10/2015 |

PULP-MOLDED CUP LID WITH LEAKPROOF STRUCTURE

CROSS REFERENCE TO RELATED APPLICATIONS

This Application claims priority of Chinese Utility Model Application No. CN202320139891.3, filed on Feb. 1, 2023, now issued as Patent No. CN219326103U, the entirety of which is incorporated by reference herein.

BACKGROUND OF THE INVENTION

Field of the Invention

The present invention relates to a technical field of a pulp-molded cup lid product, and more particularly, to a pulp-molded cup lid having a leakproof structure.

Description of Related Art

At early time, disposable beverage cup bodies and their cup lids, both of which were made from plastic-based materials, were extremely apt to be not only detrimental to human health under a long-term usage (particularly usage in a high-temperature situation) but also to be massively discarded after used, to invoke serious damages for the natural environment.

To resolve such an issue that the afore-mentioned plastic cup body/cup lid incurred, currently there is a pulp-molded cup body/cup lid made from wet plant fibers by a pulp-molding technique, in more conformity with the biodegradability or the compostability, namely the current environmental conservation requirements; however, as well known, the prior pulp-molded cup lids made from the wet plant fibers have a poor structural strength and flexibility than the plastic cup lid, and therefore are not capable of being apt to tightly snap on an annular roll side formed above an opening perimeter of the cup body, as well as being not capable of effectively leakproof sealing every section of the annular roll side toward a way of preventing a fluid (e.g., a beverage), stored inside the cup body, from leakage outside the cup body. With regard to various kinds of designs of the prior pulp-molded cup lids, please refer to Taiwanese patent numbers TWI430923B, TWI542755B, TWI736922B, and U.S. patent publication numbers/issue numbers US20180086511A1, US20130248481A1, U.S. Pat. Nos. 4,412,629, 5,624,053, 8,196,772, and Chinese patent numbers/publication numbers CN205493411U, CN111996841A, CN2441403Y, CN101637982A, CN103603234B, CN201431246Y, CN202807367U, and PCT international publication numbers WO2011009229A1, WO2011152703A1, WO2013013550A1 and WO2015157877A1, and so forth.

Thus, it is essential to provide an improved pulp-molded cup lid, in order to resolve the technical problem incurred for the above-mentioned prior arts.

BRIEF SUMMARY OF THE INVENTION

Hence, to resolve the technical matters of the above-mentioned prior art, a primarily inventive objective of the present invention is to provide a pulp-molded cup lid with a leakproof structure, which is integrally shaped by thermally compressing a pulp, mixed with a raw material such as wet plant fibers, under a closed match manner between two coupled male and female moulds, associated with a wet plant-fiber pulp-molding technique. Thereamong, the pulp-molded cup lid includes an upward-bent bottom of an annularly caved channel formed therein, an annular hook and a bulger both located inside an annularly peaked saddle formed thereon, the three of which jointly constitute the leakproof structure, by a way that the pulp-molded cup lid covers on a cup body to make the three of the upward-bent bottom, the annular hook and the bulger, which are respectively located at several different standard position angles relative to the annularly peaked saddle, jointly clamping an annular roll side of the cup body, and the standard position angle where the bulger is located is an acute angle, thereby making the annular roll side being tightly snapped-on, water-sealed and movement-restricted inside a movement-restricting space of the annularly peaked saddle. Therefore, the present invention is capable of not only making the pulp-molded cup lid tightly snapping on the annular roll side but also making the annular roll side being effectively leakproof sealed to prevent a fluid from leakages outside the cup body, as avoiding the prior technical matters that the prior pulp-molded cup lids can not be apt to tightly snap on the annular roll side and are therefore hard to make its annular roll side being effectively leakproof sealed to prevent a fluid, stored within the cup body, from spillover.

Furthermore, another inventive objective of the present invention is to provide a pulp-molded cup lid with a leakproof structure, which is integrally shaped by thermally compressing a pulp, mixed with a raw material such as wet plant fibers, under a closed match manner between two coupled male and female moulds associated with a wet plant-fiber pulp-molding technique, wherein an annularly peaked saddle of the pulp-molded cup lid is circumferentially segmented into a first section and a second section both which respectively have longitudinally cross-sectional thicknesses different from each other, and a thickness-difference staged portion is formed around an juncture between the first and second sections, and an upward-bent bottom of an annularly caved channel, an annular hook, and either of both a bulger and the thickness-difference staged portion of the pulp-molded cup lid jointly constitute the leakproof structure, by a way that the pulp-molded cup lid covers on a cup body to make the upward-bent bottom, the annular hook, and either of both the bulger and the thickness-difference staged portion, which are respectively located at several different standard position angles relative to the annularly peaked saddle, jointly clamping an annular roll side of the cup body in a tight manner that the annular roll side is tightly snapped-on, water-sealed and movement-restricted within the annularly peaked saddle. Therefore, the present invention is capable of not only making the pulp-molded cup lid tightly snapping on the annular roll side but also making respective circumferentially extending regions of the annular roll side, which have different longitudinally cross-sectional thicknesses, being effectively leakproof sealed to prevent a fluid from leakages outside the cup body. This avoids the prior technical matters that the prior pulp-molded cup lids can not make the respective circumferentially extending regions of the annular roll side, which have different longitudinally cross-sectional thicknesses, being effectively leakproof sealed to prevent a fluid, stored within the cup body, from spillover.

Furthermore, another inventive objective of the present invention is to provide a pulp-molded cup lid with a leakproof structure, which is integrally shaped by thermally compressing a pulp, mixed with a raw material such as wet plant fibers, under a closed match manner between two coupled male and female moulds associated with a wet plant-fiber pulp-molding technique, wherein an entire structure of the pulp-molded cup lid, comprising the leakproof structure, is entirely formed at positive draft angles relative to a longitudinal center line (regarded as a demoulding direction) passing through both the male and female moulds, thereby being capable of simplifying a mould assembly structured with a number of mould components (e.g., it is not essential to extra deploy a laterally-sliding component therein for laterally demoulding), lowering its mould component costs, easing its maintenance, and shortening its production cycle time for the respective pulp-molded cup lids, so as to be in a manner of benefiting consistent and massive production of successively automated machines, ensuring a higher product yield rate and quality, and raising an automatic-production efficiency.

To accomplish the afore-mentioned inventive objective, the present invention provides a technical solution where a pulp-molded cup lid with a leakproof structure, which is integrally shaped by a closed match manner between two coupled male and female moulds associated with a wet plant-fiber pulp-molding technique, comprises a central dominating portion, an annularly caved channel, an annularly peaked saddle, and the leakproof structure.

The central dominating portion is upwardly extended from a bottom side of the pulp-molded cup lid.

The annularly peaked saddle is formed, along an outer perimeter of the pulp-molded cup lid, with two opposing lateral sides both which jointly define an annularly slotted groove concaved downwardly therebetween and inside the annularly peaked saddle, to be nested over an annular roll side of a cup body, wherein the two opposing lateral sides includes a first lateral side downwardly extending to form a skirt wall where an inner wall surface thereof has an annular hook protruding toward inside the annularly slotted groove, and a second lateral side downwardly extending.

The annularly caved channel is concaved upwardly, between both the annularly peaked saddle and the central dominating portion, to form an upward-bent bottom with a connecting side connected to the second lateral side.

Thereamong, the upward-bent bottom of the annularly caved channel, the annular hook, and a bulger formed within the annularly peaked saddle jointly constitute the leakproof structure. The three of the connecting side of the upward-bent bottom, the annular hook, and the bulger jointly define a movement-restricting space within the annularly slotted groove, and the movement-restricting space has a vertical axis extended toward a peak of the annularly peaked saddle, and a horizontal axis extended toward the skirt wall, both which perpendicularly intersect to make the movement-restricting space forming several different standard position angles all starting at a right side of the intersected horizontal axis, and after the annular roll side of the cup body is inserted and accommodated within the annularly slotted groove, the three of the upward-bent bottom, the annular hook and the bulger, which are located respectively at the several different standard position angles, jointly clamp the annular roll side in a manner to make the annular roll side being tightly snapped-on, water-sealed and movement-restricted within the movement-restricting space, toward a way of preventing a fluid, stored within the cup body, from spillover, and the standard position angle where the bulger is located is an acute angle.

Preferably, the standard position angle where the bulger is located is 45 degrees.

Preferably, the bulger is protruded from the inner wall surface of the annularly slotted groove toward the movement-restricting space, to form an outer arc angle at a top surface of the bulger, and two inner arc angles respectively at two opposing lower sides of the bulger.

Preferably, within the annularly slotted groove, a longitudinally cross-sectional thickness of a place where the bulger is located is less than a longitudinally cross-sectional thickness of a place where the annular hook is located.

Preferably, by the perpendicular intersection between both of the vertical axis and the horizontal axis, the movement-restricting space is radially divided into four different quadrantal regions, to make the several different standard position angles respectively ending at a number of the different quadrantal regions, toward a way of further making the upward-bent bottom, the annular hook and the bulger being respectively distributed over the number of the different quadrantal regions, wherein the standard position angle where the bulger is located is a first quadrantal angle.

Preferably, the standard position angle where the upward-bent bottom is located is a second quadrantal angle or a third quadrantal angle, and the standard position angle where the annular hook is located is a first quadrantal angle or a fourth quadrantal angle.

Preferably, the leakproof structure further comprises that the annularly peaked saddle is circumferentially segmented into a first section and a second section both which commonly have an juncture formed with a thickness-difference staged portion integrally interconnecting between the first and second sections, and the thickness-difference staged portion is formed with an inner thickness-difference step located, around the inner wall surface of the annularly slotted groove, with corresponding to an outer thickness-difference step formed around a thickness-difference overlapping portion of the annular roll side of the cup body, to make the thickness-difference staged portion tightly snapping-on and water-sealing around the thickness-difference overlapping portion.

Besides, the present invention further provides another technical solution where a pulp-molded cup lid with a leakproof structure, which is integrally shaped by a closed match manner between two coupled male and female moulds associated with a wet plant-fiber pulp-molding technique, is used for a cup body where an annular roll side forms a thickness-difference overlapping portion with an outer thickness-difference step, and comprises a central dominating portion, an annularly caved channel, an annularly peaked saddle, and the leakproof structure.

The central dominating portion is upwardly extended from a bottom side of the pulp-molded cup lid.

The annularly peaked saddle is formed, along an outer perimeter of the pulp-molded cup lid, with two opposing lateral sides both which jointly define an annularly slotted groove concaved downwardly therebetween and inside the annularly peaked saddle, to be nested over an annular roll side of a cup body, wherein the two opposing lateral sides includes a first lateral side downwardly extending to form a skirt wall where an inner wall surface thereof has an annular hook protruding toward inside the annularly slotted groove, and a second lateral side downwardly extending.

The annularly caved channel is concaved upwardly, between both the annularly peaked saddle and the central dominating portion, to form an upward-bent bottom with a connecting side connected to the second lateral side.

Thereamong, the annularly peaked saddle is circumferentially segmented into a first section and a second section both which commonly have an juncture formed with a thickness-difference staged portion integrally interconnecting between the first and second sections, and the thickness-difference staged portion is formed with an inner thickness-difference step located, around the inner wall surface of the annularly slotted groove, with corresponding to the outer thickness-difference step of the thickness-difference overlapping portion of the annular roll side of the cup body, wherein the upward-bent bottom of the annularly caved channel, the annular hook, and the thickness-difference staged portion jointly constitute the leakproof structure, and after the annular roll side of the cup body is inserted and accommodated within the annularly slotted groove, the three of the upward-bent bottom, the annular hook, and the thickness-difference staged portion are utilized to jointly clamp the annular roll side within the annularly slotted groove, in a manner to make the annular roll side being tightly snapped-on, water-sealed and movement-restricted within the annularly slotted groove, and to make the thickness-difference staged portion tightly snapping-on and water-sealing around the thickness-difference overlapping portion, toward a way of preventing a fluid, stored within the cup body, from spillover.

Preferably, a longitudinally cross-sectional thickness difference, which is formed at the inner thickness-difference step of the thickness-difference staged portion, is in a range of 0.1~0.4 mm between both the first section and the second section.

Preferably, by way of the inner thickness-difference step of the thickness-difference staged portion being shaped complementary to the inner thickness-difference step of the thickness-difference overlapping portion, the thickness-difference staged portion tightly snaps on and water-seals around the thickness-difference overlapping portion.

Preferably, the leakproof structure further comprises a bulger formed on the inner wall surface of the first lateral side of the annularly slotted groove.

In the afore-mentioned respective preferred embodiments, the leakproof structure is entirely formed at a positive draft angle relative to a longitudinal center line passing through both the male and female moulds.

In comparison with the prior arts, the present invention can bring the following technical effects that: an entire structure of the pulp-molded cup lid according to the present invention is integrally shaped by way of thermally compressing a pulp, mixed with a raw material such as wet plant fibers, under a closed-match manner between two coupled male and female moulds associated with a wet plant-fiber pulp-molding technique, and in the pulp-molded cup lid, an upward-bent bottom of an annularly caved channel, and both an annular hook and a bulger located inside an annularly peaked saddle, jointly constitute a leakproof structure, wherein the three of the upward-bent bottom, the annular hook and the bulger, which are respectively located at several different standard position angles relative to the annularly peaked saddle, jointly clamp an annular roll side of a cup body in a tight manner, and the standard position angle where the bulger is located is an acute angle so as to make the annular roll side being tightly snapped-on, water-sealed and movement-restricted within a movement-restricting space of the annularly peaked saddle, thereby avoiding the prior technical matters that the prior pulp-molded cup lids can not be apt to tightly snap on the annular roll side and to make the annular roll side being effectively leakproof sealed to prevent a fluid, stored within the cup body, from spillover. Furthermore, the annularly peaked saddle is circumferentially segmented into a first section and a second section both of which commonly have an juncture formed with a thickness-difference staged portion integrally interconnecting between the first and second sections, and the thickness-difference staged portion is formed around the juncture between the first and second sections, whereby the upward-bent bottom of the annularly caved channel, the annular hook, and either of both the bulger and the thickness-difference staged portion of the pulp-molded cup lid, jointly constitute the leakproof structure to make the upward-bent bottom, the annular hook, and either of both the bulger and the thickness-difference staged portion, which are respectively located at several different standard position angles, jointly clamping the annular roll side within the annularly peaked saddle, for the annular roll side being tightly snapped-on, water-sealed and movement-restricted within the annularly peaked saddle. Understandingly, the present invention is capable of not only making the pulp-molded cup lid tightly snapping on the annular roll side, to avoid the prior technical matters that the prior pulp-molded cup lids can not only make two circumferentially extending regions on the annular roll side, which have different radial cross-sectional thicknesses, being effectively leakproof sealed to prevent a fluid, stored within the cup body, from spillover, but also making the leakproof structure being entirely formed at a positive draft angle relative to a longitudinal center line (regarded as a demoulding direction) passing through both the male and female moulds, thereby being capable of simplifying a mould assembly structured with a number of multidirectional mould components (e.g., it is not essential to extra deploy an use-for-demoulding laterally-sliding component), lowering its mould component costs, easing its maintenance, and shortening its production cycle time for the respective pulp-molded cup lids, to be in a manner of benefiting consistent and massive production of successively automated machines, ensuring a higher product yield rate and quality, and raising an automatic-production efficiency.

BRIEF DESCRIPTION OF THE DRAWINGS

To more definitely explain respective embodiments or the prior arts, the figures described in the embodiments or the prior art would be simply introduced thereinafter. It should be realized that the following descriptions for the embodiments and their relevant figures are rendered only for exemplifying the present invention but not for defining the claim scope of the present invention.

DETAILED DESCRIPTION OF THE INVENTION

The respective preferred embodiments and their companying drawings according to the present invention are further described below only for making the person, which has an ordinary skill in a technique art which the present invention pertains to, accomplishing enablement according to the present invention. The respective preferred embodiment exemplified in accordance with the present invention should not be regarded as a limitation to the claim scope of the present invention. In the following descriptions for the present invention, it should be realized that, a variety of directional terms mentioned in the present invention, comprise but do not limit to, such as "center", "upward", "downward", "outward", "front", "rear", "left", "right", "top", "bottom", "inside", "circumferential", "radial", "longitudinal" and so forth, on the basis of these directional positions or remove indicated relative to the depictions of the attached figures, only for facilitating a simplified description to the present invention but not indicating or hinting that the mentioned device or component has to be located at a specific directional position, or moved in a specific direction. Thus, it should not be realized as the limitations to the claim scope of the present invention. Besides, another terms, such as "first", "second" and so forth are described only for distinguishing objects but not indicating or hinting the amount of some technical characterizations, and therefore the respective technical characterization with respectively specifying the terms "first" and "second" is capable of indicating or hinting that its amount may be just one or multiple of the technical characterization, unless there are definitely and concretely claim—limited to the amount of the respective technical characterization.

Figure 1A:
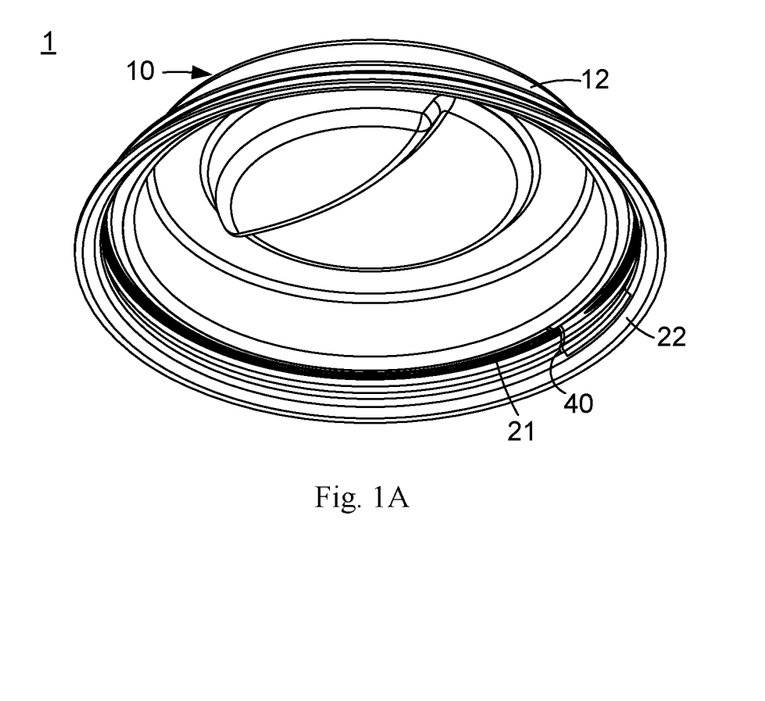
FIG. 1A depicts a stereoscopic bottom side view of a pulp-molded cup lid, with a leakproof structure, of a preferred embodiment according to the present invention.
Figure 1B:
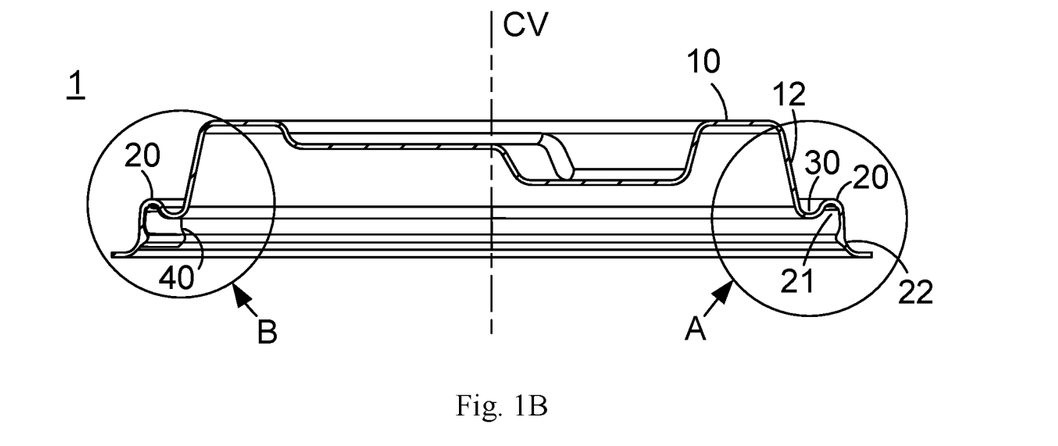
FIG. 1B depicts a laterally cross-sectional view according to the pulp-molded cup lid depicted in FIG. 1A.

First of all, please refer to FIGS. 1A & 1B wherein FIG. 1A depicts a stereoscopic bottomside view of a pulp-molded cup lid 1, with a leakproof structure, of a preferred embodiment according to the present invention, and FIG. 1B depicts a laterally cross-sectional view according to the pulp-molded cup lid 1 depicted in FIG. 1A. In this present invention, an entire structure of the respective pulp-molded cup lid 1 is integrally fabricated through consistently automatic production machines associated with a wet plant-fiber pulp-molding technique. The wet plant-fiber pulp-molding technique comprises the following steps of: collecting a pulp mixed with a primary raw material such as wet plant fibers, pre-compressing the pulp to remove a less portion of moistures contained in the pulp and to thereby form a wet rough body, and then thermally compressing the wet rough body, under a closed-match manner between two coupled male and female moulds allocated in the consistently automatic production machines, to remove a larger portion of moistures contained in the wet rough body and to thereby integrally shape the entire structure of the pulp-molded cup lid 1. The 'pulp-molded cup lid' called herein comprises but is not limited to one of a semi-finished product, a ready-for-processing article, and a finished product of the pulp-molded cup lid 1. Preferably, a material ingredient of the wet plant fibers comprises a composition of 60% plant-based long fibers and 40% plant-based short fibers, such as bamboo fibers and bagasse, thereby being capable of making the entire structure of the pulp-molded cup lid 1 being strengthened with an interweaving effect therethrough, and conforming with FDA food-grade certification standards so as to accomplish a biodegradability and a bio-compostability both for the environmental conservation requirements.

Referring to FIGS. 1A & 1B, the pulp-molded cup lid 1 is primarily structured with a central dominating portion 10, an annularly peaked saddle 20, an annularly caved channel 30, and the leakproof structure (detailed later). The central dominating portion 10 is upwardly extended from a bottom side of the pulp-molded cup lid 1 to form a peripheral sidewall 12 around a longitudinal center line CV of the pulp-molded cup lid 1. Preferably, a fluid outlet (not shown), which is formed on a peak of a specific location of an upper surface of the central dominating portion 10, is treated as a fluid-draining tube to drain away a fluid stored inside a cup body 3 (see FIG. 2A) while a user drinks it.

Figure 1C:
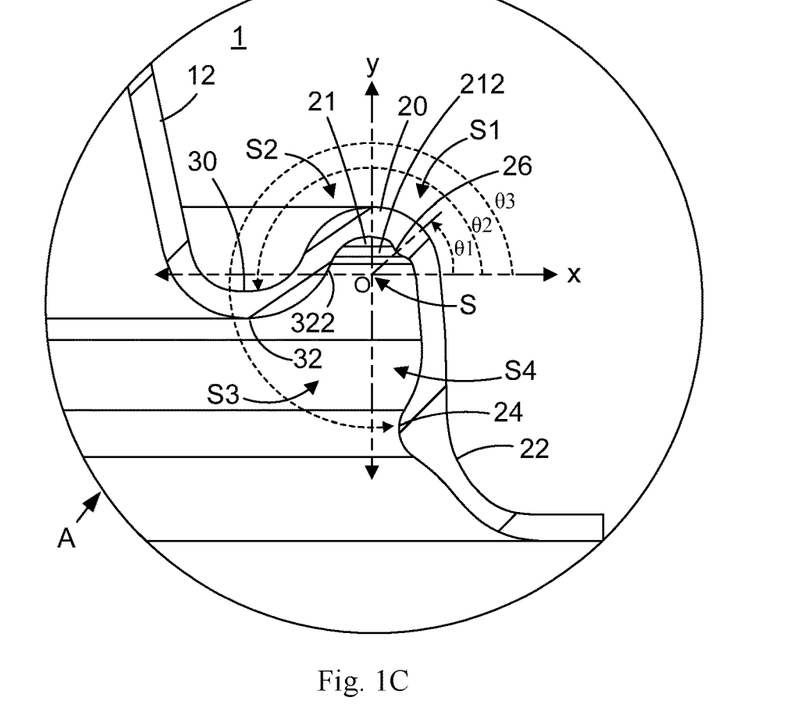
FIG. 1C depicts a locally enlarged view according to a circled region 'A' drawn on the pulp-molded cup lid depicted in FIG. 1B.

Please further refer to the illustrations shown in FIGS. 1A, 1B & 1C wherein FIG. 1C depicts a locally enlarged view of a circled region 'A' drawn on the pulp-molded cup lid 1 depicted in FIG. 1B. The annularly caved channel 30 is formed peripherally around the peripheral sidewall 12 of the central dominating portion 10, to integrally interconnect between both the annularly peaked saddle 20 and the central dominating portion 10. Besides, the annularly caved channel 30 is concaved upwardly to form an upward-bent bottom 32. In this present preferred embodiment, a longitudinal cross-section of the upward-bent bottom 32 is rendered with a generally U-shaped shape but not therefore limited thereto. Substantially, any one kind of structure, a cross-sectional shape of which can provide a rebounding force after being transversally pressured, is capable of being acceptable. For example, in another embodiment, a longitudinal cross-section of the upward-bent bottom 32 might have a generally V-shaped shape. The upward-bent bottom 32 has two opposing sides that include a permanent side integrally connected to the peripheral sidewall 12 of the central dominating portion 10, and a connecting side 322 located oppositely to the permanent side.

Figure 2A:
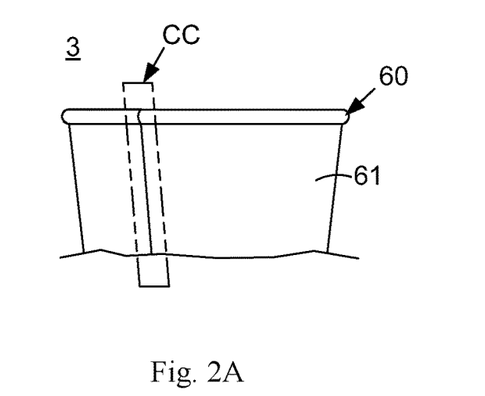
FIG. 2A depicts a local front view of a typical cup body.

Further referring to FIGS. 1A, 1B & 1C, along an outer perimeter of the pulp-molded cup lid 1, the annularly peaked saddle 20 is formed with two opposing lateral sides both of which jointly define an annularly slotted groove 21 concaved downwardly between the two opposing lateral sides and within the annularly peaked saddle 20, in order to be nested over an annular roll side 60 formed around an opening perimeter of the cup body 3 (see FIG. 2A). And, a topmost tip of the annularly peaked saddle 20 is formed with a closed convex peak. The two opposing lateral sides include a first lateral side (as an outer lateral side) downwardly extending to form a skirt wall 22 where an inner wall surface thereof has an annular hook 24 protruding toward inside the annularly slotted groove 21, and a second lateral side (as an inner lateral side) downwardly extending to be integrally connected with the connecting side 322 of the upward-bent bottom 32 of the annularly caved channel 30. After the annular roll side 60 of the cup body 3 (see FIGS. 2A & 2B) is pressured to be inserted and accommodated inside the annularly slotted groove 21 of the pulp-molded cup lid 1 to facilitate the annular roll side 60 respectively exerting lateral pressures onto the two opposing lateral sides of the annularly peaked saddle 20, the connecting side 322 of the upward-bent bottom 32 can therefore generate a rebounding force fed back onto the annular roll side 60, thereby achieving an elastically clamping retention on the annular roll side 60. Furthermore, an annular bulger 26 is integrally formed on and around an inner wall surface of the first lateral side of the annularly slotted groove 21. However, it should be noted that, the bulger 26 can be realized with a combination of a number of discontinuous bulgers 26, or a single successively-extended bulger 26, arranged annularly around the inner wall surface of the first lateral side of the annularly slotted groove 21.

In details for this present preferred embodiment depicted in FIG. 1C, the bulger 26 is protruded from the inner wall surface of the annularly slotted groove 21 toward inside the annularly slotted groove 21, to thereby form an outer arc angle at a top surface of the bulger 26, and two same or different inner arc angles respectively at two opposing lower sides of the bulger 26. For example, a height of the bulger 26 protruded is in a range between 0.1~0.3 mm, the outer arc angle of the bulger 26 might be a R-angle with a radius of 0.5 mm, and each of the two inner arc angles might be a R-angle with a radius of 0.3 mm, but there are therefore not limited to these afore-mentioned dimensions. Since the protruded height of the bulger 26, the R-angle degrees of either the outer arc angle or the respective inner arc angle could be varied on a basis of a variety of practical demands. Within the annularly slotted groove 21 of the annularly peaked saddle 20 as shown in FIG. 1C, a longitudinally cross-sectional thickness of a place where the bulger 26 is located is less than a longitudinally cross-sectional thickness of another place where the annular hook 24 is located, for making the annularly peaked saddle 20 entirely having uneven longitudinally cross-sectional thicknesses.

Further referring to FIGS. 1B & 1C, the leakproof structure of the pulp-molded cup lid 1 is constituted jointly by the upward-bent bottom 32 of the annularly caved channel 30, and both the annular hook 24 and the bulger 26 located inside the annularly peaked saddle 20. In the leakproof structure, the three of the connecting side 322 of the upward-bent bottom 32, the annular hook 24 and the bulger 26 jointly define a movement-restricting space 212 within the annularly slotted groove 21. As shown in FIG. 1C, the movement-restricting space 212 has a vertical axis 'y' extended toward the convex peak of the annularly peaked saddle 20, and a horizontal axis 'x' extended toward the skirt wall 22. Both of the vertical axis 'y' and the horizontal axis 'x' perpendicularly intersect at an origin 'O' to constitute a standard position coordinate 'S' on the annularly peaked saddle 20, and to thereby further form several different standard position angles θ1, θ2, θ3 all with relation to the standard position coordinate 'S' of the annularly peaked saddle 20 and starting at a right side of the intersected horizontal axis 'x', wherein the respective standard position angle θ1, θ2, θ3 is a positive value, or one of the standard position angles is zero, whereas each of the other two angles is a positive value.

As depicted in FIGS. 1C & 2A, after the annular roll side 60 of the cup body 3 is pressured to be inserted and accommodated within the annularly slotted groove 21 of the pulp-molded cup lid 1, the three of the upward-bent bottom 32, the annular hook 24, and the bulger 26, which are located respectively at the afore-mentioned different standard position angles θ1, θ2, θ3 all with relation to the standard position coordinate 'S' of the annularly peaked saddle 20, are utilized to jointly clamp the annular roll side 60 at its different positions (e.g., on an upper right, a lower right, and a lower left of the annular roll side 60) as respectively corresponding to the several different standard position angles θ1, θ2, θ3, in a manner to make the annular roll side 60 being tightly snapped-on, water-sealed and movement-restricted within the movement-restricting space 212, thereby effectively preventing a fluid, stored inside the cup body 3, from spillover. Meanwhile, the standard position angle θ1, with relation to the standard position coordinate 'S' and starting at the right side of the intersected horizontal axis 'x', where the bulger 26 is located is an acute angle; preferably, the standard position angle θ1 where the bulger 26 is located is 45 degrees. In this present preferred embodiment, with relation to the same standard position coordinate 'S' and starting at the same right side of the interested horizontal axis 'x', although the standard position angle θ2 where the upward-bent bottom 32 is located is larger than 180 degrees (namely)θ2>180°, the standard position angle θ3 where the annular hook 24 is located is larger than 270 degrees (namely)θ3>270°. However, both the upward-bent bottom 32 and the annular hook 24 are not therefore limited to the angle degrees of the respective standard position angles θ2, θ3. In another embodiment, any other angle degrees which are enough to make both the upward-bent bottom 32 and the annular hook 24 being evenly distributed over different quadrantal regions (detailed later) on the standard position coordinate 'S' or having several standard position angles different from each other, can also be acceptable. For example, the standard position angle θ2 where the upward-bent bottom 32 is located can also be in a range of 180°>θ2>90°, and the standard position angle θ3 where the annular hook 24 is located can also be in a range of 360°≥θ3>270°.

In details with reference to the illustration shown in FIG. 1C, by way of the perpendicular intersection between both of the vertical axis 'y' and the horizontal axis 'x' to form the standard position coordinate 'S' on the annularly peaked saddle 20, the movement-restricting space 212 of the annularly slotted groove 21 is therefore radially divided into four different quadrantal regions (namely a first quadrantal region S1, a second quadrantal region S2, a third quadrantal region S3, and a fourth quadrantal region S4) such that the several different standard position angles θ1, θ2, θ3 are respectively formed with starting at the right side of the intersected horizontal axis 'x' and ending at a number of the four different quadrantal regions, such as these signs S1, S2, S4 labeled thereon, toward a way of further making the upward-bent bottom, the annular hook 24 and the bulger 26 being respectively distributed over the number of the different quadrantal regions (such as S1, S2, S4), wherein the standard position angle θ1 where the bulger 26 is located is a first quadrantal angle belonging to the first quadrantal region S1. Preferably, the standard position angle θ2 where the upward-bent bottom 32 is located is a third quadrantal angle belonging to the third quadrantal region S3, and the standard position angle θ3 where the annular hook 24 is located is a fourth quadrantal angle belonging to the fourth quadrantal region S4. However, in another design, a corresponding quadrantal region or an angle scale of the corresponding standard position angle θ2 or θ3, where each of the upward-bent bottom 32 and the annular hook 24 is located can be varied on a basis of various practical demands. For example, in another design, the standard position angle θ2 where the upward-bent bottom 32 is located can be a second quadrantal angle such as an obtuse angle ending at the second quadrantal region S2, and the standard position angle θ3 where the annular hook 24 is located can be a first quadrantal angle such as an acute angle ending at the first quadrantal region S1.

Figure 2B:
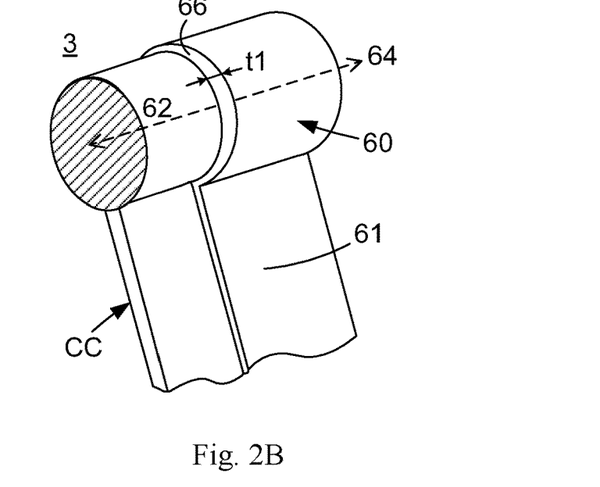
FIG. 2B depicts a stereoscopically sliced view according to a sliced region 'CC' drawn to focus on a thickness-difference overlapping portion of the typical cup body depicted in FIG. 2A.

As shown in FIGS. 1B-1C and 2A, although the present invention brings the technical effects sufficient to jointly clamp the annular roll side 60 in a tight manner within the annularly slotted groove 21 by the leakproof structure that is jointly constituted with the three of the upward-bent bottom 32, the annular hook 24 and the bulger 26, to make the annular roll side 60 being tightly snapped-on, water-sealed and movement-restricted within the movement-restricting space 212, toward a way of preventing a fluid, stored inside the cup body 3, from spillover. However, as depicted in FIGS. 2A & 2B, FIG. 2B depicts a stereoscopically-sliced view of a sliced region 'CC' on the cup body 3 depicted in FIG. 2A, which focuses on a thickness-difference overlapping portion 66 formed radially around a longitudinally outer circumferential surface of the annular roll side 60 of the cup body 3. As commonly known, for most of the prior cup bodies like the cup body 3, a cylindrically standing paper cup wall 61 is formed with a hollow therein by way of annularly rolling a single paper layer or multiple paper layers to achieve an end-to-end overlapping juncture along a circumferential direction of the standing paper cup wall 61; and then, an inner surface of the standing paper cup wall 61 is further adhered thereto with a waterproof layer (e.g., a laminating film) for achieving a waterproofing function, whereby such an end-to-end overlapping juncture inherently would form the thickness-difference overlapping portion 66 (which contains a thickness of the waterproof layer) thereon. Further referring to the sliced region 'CC' depicted in FIG. 2B, the annular roll side 60 is circumferentially divided into two circumferentially extending regions 62, 64 both of which have different cross-sectional thicknesses to thereby overlap-form the thickness-difference overlapping portion 66 radially around the annular roll side 60 at the end-to-end overlapping junction, with integrally interconnecting between the circumferentially extending regions 62, 64, of a paper layer which is used to construct both the annular roll side 60 and the standing paper cup wall 61. The two circumferentially extending regions 62, 64 are respectively extended circumferentially toward two opposite circumferential directions from two right and left sides of the thickness-difference overlapping portion 66. Furthermore, the longitudinally outer circumferential surface of the thickness-difference overlapping portion 66 will is rendered with an outer thickness-difference step (containing the thickness of the waterproof layer), namely a longitudinally cross-sectional thickness difference t1.

Figure 3A:
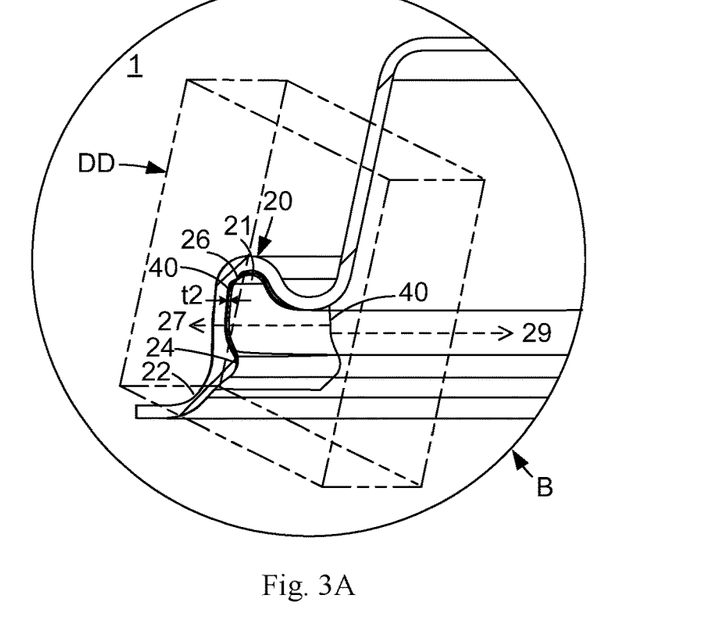
FIG. 3A depicts a locally enlarged view according to a circled region 'B' drawn on the pulp-molded cup lid depicted in FIG. 1B.
Figure 3B:
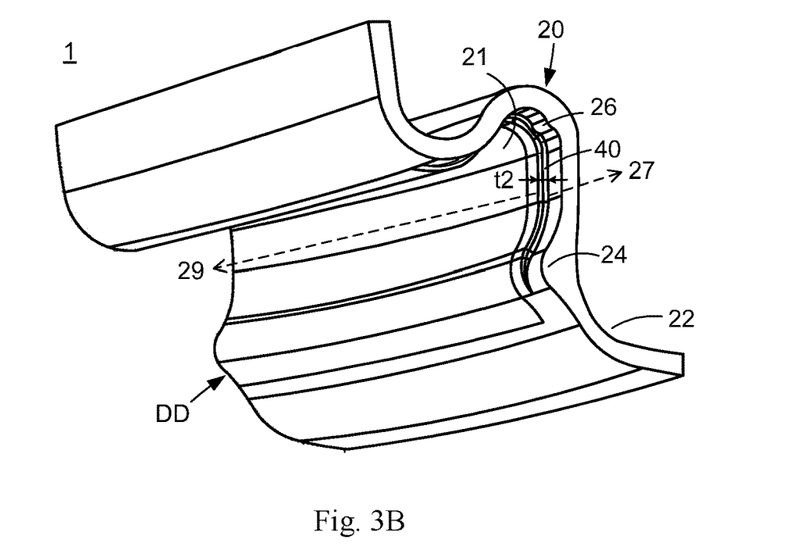
FIG. 3B depicts a stereoscopically sliced view according to a sliced region 'DD' drawn to focus on a thickness-difference staged portion of the pulp-molded cup lid depicted in FIG. 3A.

Further referring to FIGS. 2B & 3A-3B, FIG. 3A depicts a locally enlarged view according to a circled region 'B' drawn on the pulp-molded cup lid 1 in FIG. 1B, and FIG. 3B depicts a stereoscopically sliced view of a sliced region 'DD' drawn thereon to focus on a thickness-difference staged portion 40 of the pulp-molded cup lid 1 depicted in FIG. 3A. For corresponding to the outer thickness-difference step of the thickness-difference overlapping portion 66 of the annular roll side 60 of the typical cup body 3, the annularly peaked saddle 20 of the pulp-molded cup lid 1 is circumferentially segmented into two sections, which include a first section 27 and a second section 29, both commonly having an juncture formed with the thickness-difference staged portion 40 integrally interconnecting between the first and second sections 27, 29 having different longitudinally cross-sectional thicknesses from each other. Accordingly, the thickness-difference staged portion 40 is formed with an inner thickness-difference step located, continuously around the inner wall surface of the annularly slotted groove 21 from the first lateral side to the skirt wall 22 through both the bulger 26 and the annular hook 24, with corresponding to the outer thickness-difference step of the thickness-difference overlapping portion of the annular roll side of the cup body 66 of the cup body 3 shown in FIG. 2B. Preferably, the inner thickness-difference step of the thickness-difference staged portion 40 is shaped with containing the thicknesses of the waterproof layer of the pulp-molded cup lid 1. In details, by way of the inner thickness-difference step of the thickness-difference staged portion 40 being substantially shaped complementary to the outer thickness-difference step of the thickness-difference overlapping portion 66, the thickness-difference staged portion 40 of the pulp-molded cup lid 1 can snap-on and water-seal around the thickness-difference overlapping portion 66 of the cup body 3 in a tight manner. For example, the first section 27, having a thinner thickness, of the pulp-molded cup lid 1 can be correspondingly snapped-on with the circumferentially extending region 64, having a thicker thickness, of the cup body 3, whereas the second section 29 having a thicker thickness can be correspondingly snapped-on with the circumferentially extending region 62 having a thinner thickness, through just complementary surface-to-surface contact therebetween, thereby making the inner thickness-difference step of the thickness-difference staged portion 40 water-sealing, snapping-on and overlapping around the outer thickness-difference step of the thickness-difference overlapping portion 66. Preferably, at the sliced region 'DD' depicted in FIGS. 3A-3B, a longitudinally cross-sectional thickness difference t2 formed around the inner thickness-difference step of the thickness-difference staged portion 40 (namely the juncture integrally interconnecting between both of the first section 27 and the second section 29) is in a range of 0.1~0.4 mm between the first section 27 and the second section 29. And, the longitudinally cross-sectional thickness difference t2 is also shaped correspondingly complementary to the longitudinally cross-sectional thickness difference t1 of the thickness-difference overlapping portion 66 formed between the two circumferentially extending regions 62, 64 of the cup body 3 shown in FIG. 2B (wherein t2≈t1).

Further referring to FIGS. 1A-1C, 2B & 3A, in another embodiment, the four of the upward-bent bottom 32 of the annularly caved channel 30, the annular hook 24, the bulger 26, and the thickness-difference staged portion 40 can also jointly constitute the leakproof structure. After the annular roll side 60 of the cup body 3 is inserted and accommodated within the annularly slotted groove 21 of the pulp-molded cup lid 1, the four of the upward-bent bottom 32, the annular hook 24, the bulger 26, and the thickness-difference staged portion 40, which are respectively located at several different standard position angles (e.g., θ1, θ2, θ3 and θ4 (not shown), wherein θ3>θ4) relative to the standard position coordinate 'S' of the annularly peaked saddle 20, are utilized to jointly clamp the annular roll side 60, within the movement-restricting space 212 of the annularly slotted groove 21, at several different positions of the annular roll side 60 with respectively corresponding to the several different standard position angles (e.g., θ1, θ2, θ3 and θ4(not shown)). This can make the annular roll side 60 being tightly snapped-on, water-sealed and movement-restricted within the movement-restricting space 212, toward a way of preventing a fluid, stored within the cup body 3, from spillover. Preferably, the respective components, such as the upward-bent bottom 32, the annular hook 24, the bulger 26 and the thickness-difference staged portion 40, which jointly constitute the leakproof structure of the pulp-molded cup lid 1, are entirely formed at positive draft angles relative to the longitudinal center line CV of the pulp-molded cup lid 1, which passes through both the male and female moulds.

However, in another preferred embodiment for different practical demand (in a case of another pulp-molded cup lid design without a formation of a bulger structure), the present invention provides another technical solution where the pulp-molded cup lid 1 can have a variance in design of a leakproof structure. For example, the leakproof structure of the pulp-molded cup lid 1 can also be jointly constituted only by the three of the upward-bent bottom 32, the annular hook 24, and the thickness-difference staged portion 40, which are respectively located at several different standard position angles relative to the standard position coordinate 'S' of the annularly peaked saddle 20, jointly clamping the annular roll side 60 within the movement-restricting space 212 of the annularly slotted groove 21, thereby making the annular roll side 60 is being tightly snapped-on, water-sealed and movement-restricted within the movement-restricting space 212, toward a way of preventing a fluid, stored within the cup body 3, from spillover.

Figure 4:
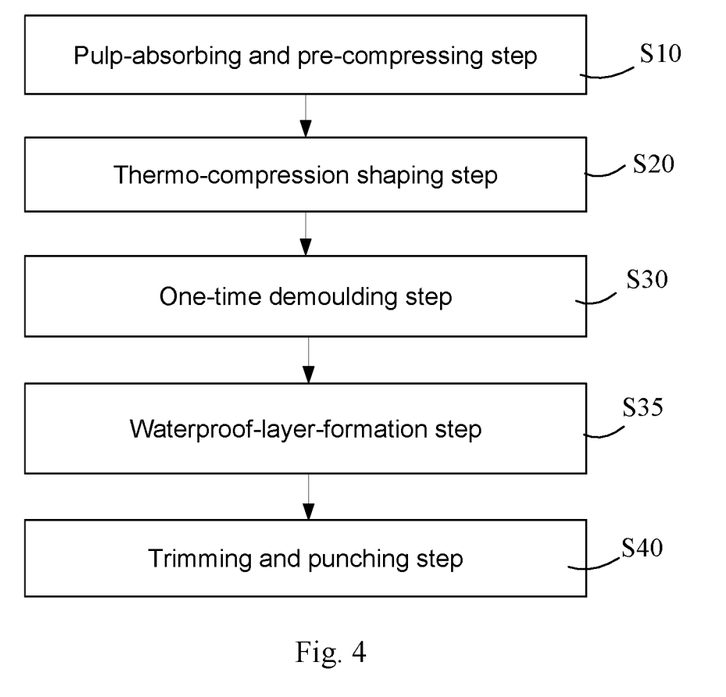
FIG. 4 depicts a step flowchart of a fabricating method of another preferred embodiment, according to the present invention, for preparing the pulp-molded cup lid with the leakproof structure, as shown in FIGS. 1A-1C and 3A-3B.

Besides, please refer to FIG. 4 which illustrates a step flowchart of a fabricating method of another preferred embodiment according to the present invention, for preparing the pulp-molded cup lid 1 with the leakproof structure, as shown in FIGS. 1A-1C and 3A-3B. An entire structure (comprising the leakproof structure) of the respective pulp-molded cup lid 1 as depicted in FIGS. 1A-1C and 3A-3B is integrally fabricated through consistently automatic production machines associated with a wet plant-fiber pulp-molding technique, wherein both the detailed introductions and component signs with reference to the respective components constituting the entire structure of the pulp-molded cup lid 1 of the preferred embodiment in FIG. 4 all can be referred to the above-mentioned respective embodiments shown in FIGS. 1A-1C & 3A-3B, and therefore will be omitted hereunder. The fabricating method primarily comprises the following steps.

A pulp-absorbing and pre-compressing step S10 is implemented that comprises: collecting a pulp mixed with a primary raw material such as wet plant fibers; and pre-compressing the pulp, under a closed-match manner between two coupled male and female moulds associated with the wet plant-fiber pulp-molding technique, so as to remove a less portion of moistures contained in the pulp and to thereby form a wet rough body.

After the step S10, a thermo-compression shaping step S20 is implemented that comprises: launching at least one-time thermo-compression shaping to thermally compress the wet rough body, under a closed-match manner between the two coupled male and female moulds (or another couple of male and female moulds for the thermo-compression shaping step), so as to remove a larger portion of moistures contained in the wet rough body and to thereby integrally shape the entire structure (comprising the respective components of the leakproof structure) of the pulp-molded cup lid 1. This called herein 'pulp-molded cup lid' comprises but is not limited to one kind of a semi-finished product, a ready-for-processing article, and a finished product of the pulp-molded cup lid 1. Preferably, a material ingredient of the wet plant fibers consists of 60% plant-based long fibers and 40% plant-based short fibers, such as bamboo fibers and bagasse, thereby strengthening the entire structure of the pulp-molded cup lid 1 with occurrence of an interweaving effect, and conforming with FDA food-grade certification standards, so as to accomplish a biodegradability and a bio-compostability both for the environmental conservation requirements.

After the step S20, a one-time demoulding step S30 is implemented for the pulp-molded cup lid 1, wherein the respective structure of the pulp-molded cup lid 1 (comprising the respective components of the leakproof structure) is entirely formed at a positive draft angle relative to a longitudinal center line CV of the pulp-molded cup lid 1, which passes through both the male and female moulds. Thus, in the consistently automatic production machines for preparing the pulp-molded cup lid 1, it is not essential to extra deploy a use-for-demoulding laterally-sliding component, thereby being capable of simplifying its mould assembly or structure.

After the step S30, a waterproof-layer-formation step S35 is implemented that comprises: forming a waterproof layer (e.g., a laminating film) onto an entire surface (comprising each surfaces of the respective components of the leakproof structure) of the pulp-molded cup lid 1 so as to prevent shrinkage distortions in a contacting-water condition.

And after the step S35, a trimming and punching step S40 is implemented that comprises: trimming burrs of the pulp-molded cup lid 1 to form an outermost sidewall with a skirt extended outwardly and transversally at an end thereof, and punching the central dominating portion 10 to thereby form a fluid outlet.

Compared with the prior arts, the present invention provides the following beneficial effects that: in the pulp-molded cup lid 1 according to the present invention, the leakproof structure is jointly constituted by the three of the upward-bent bottom 32 of the annularly caved channel 30, and the annular hook 24 and the bulger 26 of the annularly peaked saddle 20, which are respectively located at the several different standard position angles relative to the standard position coordinate 'S' on the annularly peaked saddle 20, jointly clamping the annular roll side 60 of the cup body 3, wherein the standard position angle where the bulger 26 is located is an acute angle, thereby making the annular roll side 60 being tightly snapped-on, water-sealed and movement-restricted within the movement-restricting space 212 of the annularly peaked saddle 20, as avoiding the prior technical matter that the prior pulp-molded cup lid is not apt to tightly snap on the annular roll side and is hard to make its annular roll side being effectively leakproof sealed to prevent a fluid, stored within the cup body 3, from spillover. Furthermore, the annularly peaked saddle 20 is circumferentially segmented into a first section 27 and a second section 29 both of which commonly have a juncture formed thereon with the thickness-difference staged portion 40 integrally interconnecting between the first section 27 and the second section 29. In the pulp-molded cup lid 1, the leakproof structure can also be constructed jointly with the upward-bent bottom 32 of the annularly caved channel 30, the annular hook 24, the bulger 26 and/or the thickness-difference staged portion 40, thereby making the upward-bent bottom 32, the annular hook 24, the bulger 26 and/or the thickness-difference staged portion 40, which are respectively located at the several different standard position angles relative to the standard position coordinate 'S' on the annularly peaked saddle 20, jointly clamping the annular roll side 60 within the movement-restricting space 212 of the annularly peaked saddle 20. By way of the thickness-difference staged portion 40 of the annularly peaked saddle 20 and the thickness-difference overlapping portion 66 of the annular roll side 60 of the cup body 3 both being shaped complementary to each other, the thickness-difference staged portion 40 having the longitudinally cross-sectional thickness difference t2 can effectively leakproof seal the thickness-difference overlapping portion 66 having the longitudinally cross-sectional thickness difference t1, so as to prevent a fluid, stored within the cup body 3, from spillover. Therefore, the present invention is capable of making the pulp-molded cup lid 1 tightly snapping on and water-sealing the annular roll side 60 of the cup body 3, rather than the spillover matter incurred in a poor leakproof-sealing of the prior pulp-molded cup lid against the cup body 3.

Besides, the entire structure of the pulp-molded cup lid 1 according to the present invention is integrally shaped by thermally compressing the pulps mixed with wet plant fibers under a closed-match manner between the two coupled male and female moulds associated with a wet plant-fiber pulp-molding technique. The entire structure (comprising the leakproof structure) of the pulp-molded cup lid 1 is entirely formed at positive draft angles relative to the longitudinal center line CV (regarded as a demoulding direction) of the pulp-molded cup lid 1, which passes through both the male and female moulds. Thus, the present invention is capable of simplifying a mould assembly structured with a number of mould components (e.g., it is not essential to extra deploy an use-for-demoulding laterally-sliding component), lowering its mould component costs, easing its maintenance, and shortening a production cycle time for the respective pulp-molded cup lid 1, to be in a manner of benefiting consistent and massive production of successively automated machines, ensuring a higher product yield rate and quality, and raising an automatic-production efficiency.

In conclusion, although the present invention is described with the respective preferred embodiments as described above, those skilled in the art will appreciate that various modifications, additions, and substitutions are possible without departing from the scope and the spirit of the invention. Accordingly, the scope of the present invention is intended to be defined only by reference to the claims.

What is claimed is:

1. A pulp-molded cup lid with a leakproof structure, which is integrally shaped by a closed match manner between two coupled male and female moulds associated with a wet plant-fiber pulp-molding technique, comprising:
    a central dominating portion upwardly extended from a bottom side of the pulp-molded cup lid;
    an annularly peaked saddle formed, along an outer perimeter of the pulp-molded cup lid, with two opposing lateral sides both which jointly define an annularly slotted groove concaved downwardly therebetween and inside the annularly peaked saddle, to be nested over an annular roll side of a cup body, wherein the two opposing lateral sides includes a first lateral side downwardly extending to form a skirt wall where an inner wall surface thereof has an annular hook protruding toward inside the annularly slotted groove, and a second lateral side downwardly extending; and
    an annularly caved channel, concaved upwardly between both the annularly peaked saddle and the central dominating portion, forming an upward-bent bottom with a connecting side connected to the second lateral side, wherein:
    the upward-bent bottom of the annularly caved channel, the annular hook, and a bulger formed within the annularly peaked saddle jointly constitute the leakproof structure, and the three of the connecting side of the upward-bent bottom, the annular hook, and the bulger jointly define a movement-restricting space within the annularly slotted groove, and the movement-restricting space has a vertical axis extended toward a peak of the annularly peaked saddle, and a horizontal axis extended toward the skirt wall, both which perpendicularly intersect to make the movement-restricting space forming several different standard position angles all starting at a right side of the intersected horizontal axis, and after the annular roll side of the cup body is inserted and accommodated within the annularly slotted groove, the three of the upward-bent bottom, the annular hook and the bulger, which are located respectively at the several different standard position angles, jointly clamp the annular roll side within the annularly slotted groove, in a manner to make the annular roll side being tightly snapped-on, water-sealed and movement-restricted within the movement-restricting space, toward a way of preventing a fluid, stored within the cup body, from spillover, wherein the standard position angle where the bulger is located is an acute angle.

2. The pulp-molded cup lid with the leakproof structure as claimed in claim 1, wherein the standard position angle where the bulger is located is 45 degrees.

3. The pulp-molded cup lid with the leakproof structure as claimed in claim 1, wherein the bulger is protruded from the inner wall surface of the annularly slotted groove toward the movement-restricting space, to form an outer arc angle at a top surface of the bulger, and two inner arc angles respectively at two opposing lower sides of the bulger.

4. The pulp-molded cup lid with the leakproof structure as claimed in claim 1, wherein within the annularly slotted groove, a longitudinally cross-sectional thickness of a place where the bulger is located is less than a longitudinally cross-sectional thickness of a place where the annular hook is located.

5. The pulp-molded cup lid with the leakproof structure as claimed in claim 1, wherein by the perpendicular intersection between both of the vertical axis and the horizontal axis, the movement-restricting space is radially divided into four different quadrantal regions, to make the several different standard position angles respectively ending at a number of the different quadrantal regions, toward a way of further making the upward-bent bottom, the annular hook and the bulger being respectively distributed over the number of the different quadrantal regions, wherein the standard position angle where the bulger is located is a first quadrantal angle.

6. The pulp-molded cup lid with the leakproof structure as claimed in claim 5, wherein the standard position angle where the upward-bent bottom is located is a second quadrantal angle or a third quadrantal angle, and the standard position angle where the annular hook is located is a first quadrantal angle or a fourth quadrantal angle.

7. The pulp-molded cup lid with the leakproof structure as claimed in claim 1, wherein the leakproof structure further comprises that the annularly peaked saddle is circumferentially segmented into a first section and a second section both which commonly have an juncture formed with a thickness-difference staged portion integrally interconnecting between the first and second sections, and the thickness-difference staged portion is formed with an inner thickness-difference step located, around the inner wall surface of the annularly slotted groove, with corresponding to an outer thickness-difference step formed around a thickness-difference overlapping portion of the annular roll side of the cup body, to make the thickness-difference staged portion tightly snapping-on and water-sealing around the thickness-difference overlapping portion.

8. A pulp-molded cup lid with a leakproof structure, which is integrally shaped by a closed match manner between two coupled male and female moulds associated with a wet plant-fiber pulp-molding technique, used for a cup body where an annular roll side forms a thickness-difference overlapping portion with an outer thickness-difference step, and comprising:
    a central dominating portion upwardly extended from a bottom side of the pulp-molded cup lid;
    an annularly peaked saddle formed, along an outer perimeter of the pulp-molded cup lid, with two opposing lateral sides both which jointly define an annularly slotted groove concaved downwardly therebetween and inside the annularly peaked saddle, to be nested over the annular roll side of the cup body, wherein the two opposing lateral sides includes a first lateral side downwardly extending to form a skirt wall where an inner wall surface thereof has an annular hook protruding toward inside the annularly slotted groove, and a second lateral side downwardly extending; and an annularly caved channel, concaved upwardly between both the annularly peaked saddle and the central dominating portion, forming an upward-bent bottom with a connecting side connected to the second lateral side, wherein:

the annularly peaked saddle is circumferentially segmented into a first section and a second section both which commonly have an juncture formed with a thickness-difference staged portion integrally interconnecting between the first and second sections, and the thickness-difference staged portion is formed with an inner thickness-difference step located, around the inner wall surface of the annularly slotted groove, with corresponding to the outer thickness-difference step of the thickness-difference overlapping portion of the annular roll side of the cup body, wherein the upward-bent bottom of the annularly caved channel, the annular hook, and the thickness-difference staged portion jointly constitute the leakproof structure, and after the annular roll side of the cup body is inserted and accommodated within the annularly slotted groove, the three of the upward-bent bottom, the annular hook, and the thickness-difference staged portion are utilized to jointly clamp the annular roll side within the annularly slotted groove, in a manner to make the annular roll side being tightly snapped-on, water-sealed and movement-restricted within the annularly slotted groove, and to make the thickness-difference staged portion tightly snapping-on and water-sealing around the thickness-difference overlapping portion, toward a way of preventing a fluid, stored within the cup body, from spillover.

9. The pulp-molded cup lid with the leakproof structure as claimed in claim 8, wherein a longitudinally cross-sectional thickness difference, which is formed at the inner thickness-difference step of the thickness-difference staged portion, is in a range of 0.1~0.4 mm between both the first section and the second section.

10. The pulp-molded cup lid with the leakproof structure as claimed in claim 8, wherein by way of the inner thickness-difference step of the thickness-difference staged portion being shaped complementary to the inner thickness-difference step of the thickness-difference overlapping portion, the thickness-difference staged portion tightly snaps on and water-seals around the thickness-difference overlapping portion.

11. The pulp-molded cup lid with the leakproof structure as claimed in claim 8, wherein the leakproof structure further comprises a bulger formed on the inner wall surface of the first lateral side of the annularly slotted groove.

12. The pulp-molded cup lid with the leakproof structure as claimed in claim 8, wherein the leakproof structure is entirely formed at positive draft angles relative to a longitudinal center line passing through both the male and female moulds.

* * * * *